US011884436B2

(12) United States Patent
Zuffa et al.

(10) Patent No.: US 11,884,436 B2
(45) Date of Patent: Jan. 30, 2024

(54) APPARATUS FOR THE PACKAGING OF CONTAINERS OF DEVICES FOR PHARMACEUTICAL USE

(71) Applicant: Stevanato Group S.P.A., Piombino Dese (IT)

(72) Inventors: Davide Zuffa, Ozzano dell'Emilia (IT); Fausto Mazza, Bologna (IT)

(73) Assignee: Stevanato Group S.P.A., Piombino Dese (IT)

( * ) Notice: Subject to any disclaimer, the term of this patent is extended or adjusted under 35 U.S.C. 154(b) by 0 days.

(21) Appl. No.: 17/808,070

(22) Filed: Jun. 21, 2022

(65) Prior Publication Data

US 2022/0411120 A1 Dec. 29, 2022

(30) Foreign Application Priority Data

Jun. 23, 2021 (IT) .......................... 102021000016460

(51) Int. Cl.
| | |
|---|---|
| B65B 57/06 | (2006.01) |
| B25J 9/16 | (2006.01) |
| B25J 13/08 | (2006.01) |
| B65B 5/04 | (2006.01) |
| B65B 7/02 | (2006.01) |
| B65B 31/04 | (2006.01) |
| B65B 35/16 | (2006.01) |

(Continued)

(52) U.S. Cl.
CPC ............. *B65B 57/06* (2013.01); *B25J 9/1697* (2013.01); *B25J 13/08* (2013.01); *B65B 5/045* (2013.01); *B65B 7/02* (2013.01); *B65B 31/04* (2013.01); *B65B 35/16* (2013.01); *B65B 43/30* (2013.01); *B65B 43/36* (2013.01); *B65B 51/30* (2013.01)

(58) Field of Classification Search
CPC ....... B65B 7/02; B65B 7/2807; B65B 7/2878; B65B 57/14; B65B 57/04; B65B 57/06; B65B 43/30; B65B 43/34; B65B 43/36; B65B 5/045; B65B 31/04; B65B 31/00; B65B 25/00; B65B 51/30; B65B 51/10; B65B 35/16; B65B 2220/16; B25J 13/08; B25J 9/21697; G05B 2219/45048
See application file for complete search history.

(56) References Cited

U.S. PATENT DOCUMENTS 6,654,482 B1 * 11/2003 Parent .................. G05D 1/0246
382/104
8,100,263 B2 1/2012 Vanderbush et al.
(Continued)

FOREIGN PATENT DOCUMENTS

IT 201900002693 A1 8/2020

*Primary Examiner* — Thomas M Wittenschlaeger
(74) *Attorney, Agent, or Firm* — Husch Blackwell LLP

(57) ABSTRACT

An apparatus for packaging containers of devices for pharmaceutical use includes a robotic arm movable from a gripping position, in which it picks up a container previously sealed by at least one protective sheet, to a release position in which it inserts the container into a bag through a suitable opening provided on a side of the bag; wherein the robotic arm is connected to at least one position control camera configured to read coordinates of a midpoint of the opening with respect to a lying plane on which the bag lies and/or an angle of rotation of the bag with respect to an axis perpendicular to the lying plane, so as to ensure the correct positioning and release of the container inside the bag.

9 Claims, 7 Drawing Sheets

(51) Int. Cl.
  *B65B 43/30*   (2006.01)
  *B65B 43/36*   (2006.01)
  *B65B 51/30*   (2006.01)

(56) References Cited

U.S. PATENT DOCUMENTS

| | | |
|---|---|---|
| 2002/0121073 A1 | 9/2002 | McGrane et al. |
| 2006/0048486 A1* | 3/2006 | Laing .................... B65D 25/107 |
| | | 108/51.11 |
| 2009/0223592 A1* | 9/2009 | Procyshyn .............. B65B 3/003 |
| | | 141/2 |
| 2014/0180479 A1* | 6/2014 | Argue ..................... B65B 5/105 |
| | | 901/47 |
| 2014/0352255 A1* | 12/2014 | Renken ................. B65B 43/267 |
| | | 53/386.1 |

* cited by examiner

APPARATUS FOR THE PACKAGING OF CONTAINERS OF DEVICES FOR PHARMACEUTICAL USE

CROSS REFERENCES

This application claims priority to Italian Application No. 02021000016460 filed on Jun. 23, 2021, the disclosure of which is expressly incorporated by reference herein in its entirety.

TECHNICAL FIELD

The present invention relates to an apparatus for the packaging of containers of devices for pharmaceutical use, such as syringes.

STATE OF THE ART

As is well known, the purpose of packaging apparatuses is to hermetically assemble and seal containers of devices for pharmaceutical use, such as syringes, also known as tubs, so as to ensure the sterility of their content in an area classified ISO5 under laminar flow.

The containers are hermetically sealed with the help of sheets made of Tyvek, which are suitably applied to the containers, by welding, in a known manner. It is pointed out that Tyvek is the trade name for a nonwoven fabric material of high-density polyethylene fibres formed by fibrillating a sheet through a rapid evaporation of a solvent and a subsequent welding during extrusion.

The sheets made of Tyvek are stacked on special trays and must then be taken from the apparatus, placed correctly on the trays and then welded. Typically, for each container it is used an inner protective sheet (sheet made of Tyvek) to be placed inside each initially opened container and an outer protective sheet (lid made of Tyvek) to be welded over the container and provided with a glue on its lower surface.

The sealing of the container by welding the outer protective sheet, upon correctly positioning of the outer protective sheet on the open container, takes place by a hot bar that is pressed on top by the system with a controlled force and time.

The positioning of the outer protective sheet on the open container, prior to welding, is decisive for the sterility of the finished product, since if the outer protective sheet is positioned inaccurately, a discontinuity of the weld bead may be created, thus jeopardising the sterility of the sealing.

For this purpose, there are fairly precise requirements according to which the outer protective sheet must protrude from the container by at least 1 mm on each side.

In order to ensure the correct quality of the finished product, the weld mark (visible to the naked eye or by a dedicated camera) must be centred within the tolerances described above with respect to both the container and the outer protective sheet.

The solutions of the known technique are not able to guarantee the accuracy and repeatability of said positioning and, at the same time, an adequate positioning speed. In particular, the solutions of the known technique allow for vertical displacements of the outer protective sheets prior to the welding step, with a potential risk of welding defects and subsequent waste of the sealed container.

In addition, a laminar air flow is applied throughout all the packaging steps in order to ensure sterility and to prevent contaminating particles from entering the container to be sealed.

The packaging apparatuses of the known technique are not able to guarantee the provision of the laminar flow during the packaging steps, nor they are able to control or significantly reduce the possible production of particles during the handling of the protective sheets, as they provide for a relative sliding of the protective sheets when they are taken from the packs of sheets from which they are separated.

In addition, upon having being sealed the container by welding the outer protective sheet, the container must be bagged and welded in a appropriate bag called steribag, which is single or double, to ensure the sterility of the content in an area classified ISO5, under laminar flow.

The packaging apparatus must pick up the container, previously sealed with the outer protective sheet, and insert it in a previously picked and opened bag in order to accommodate the container itself.

After having inserted the container inside the bag automatically, the sealing of the bag (steribag) is performed by a welding bar that is pressed onto the bag by the system with a controlled force and time.

The positioning of the bag before the opening and insertion of the container is decisive for the efficiency of the apparatus because if the bag is positioned incorrectly, it can open unevenly, making the insertion of the container non-continuous and impossible and causing the apparatus to stop.

The opening height of the bag and, consequently, the pull distance of the bag, i.e. the distance by which the bag is advanced once opened to be tensioned and pulled before being welded, is decisive for the correct welding of the finished product, since if the finished product is treated at the wrong height/distance, the welding is not continuous and generates wrinkles, thus invalidating the sterility of the sealing.

The solutions of the known technique are not able to precisely and repeatably control the said bag opening and pulling steps, so that non-negligible waste occur.

Furthermore, in the known solutions, the integrity check of the bag weld is left to the operator at the end of the line; in this way, the operator can only visually check the outer bag if a double bag is used. This post-verification is therefore not accurate and it does not occur timely so as to be then able to correct any malfunctions of the apparatus.

Finally, in the known solutions, the bag is welded by trying to minimise the air inside the bag during the different working steps.

In fact, the air trapped inside the bag is critical for both the double bagging process and the secondary packaging in a box since the boxes, being "inflated" with air, protrude sideways from the pallet containing them, with the risk of incurring in container breakage during the subsequent pallet handling steps.

Hence, the solutions of the known technique are not particularly effective in controlling/reducing the amount of air in the bag either.

SUMMARY

There is therefore a need to resolve the inconveniences and limitations mentioned with respect to the known art.

This need is met by an apparatus for packaging containers of devices for pharmaceutical use according to claim 1. In particular, these requirements are at least partially fulfilled by an apparatus for packaging containers of devices for pharmaceutical use that includes a robotic arm movable from a gripping position, in which it picks up a container previously sealed by at least one protective sheet, to a release position in which it inserts the container into a bag through a suitable opening provided on a side of the bag; wherein the robotic arm is connected to at least one position control camera configured to read coordinates of a midpoint of the opening with respect to a lying plane on which the bag lies and/or an angle of rotation of the bag with respect to an axis perpendicular to the lying plane, so as to ensure the correct positioning and release of the container inside the bag.

BRIEF DESCRIPTION OF THE DRAWINGS

Further features and advantages of the present invention will be more readily understood from the following description of its preferred and non-limiting examples of embodiments, wherein.

Figure 1:
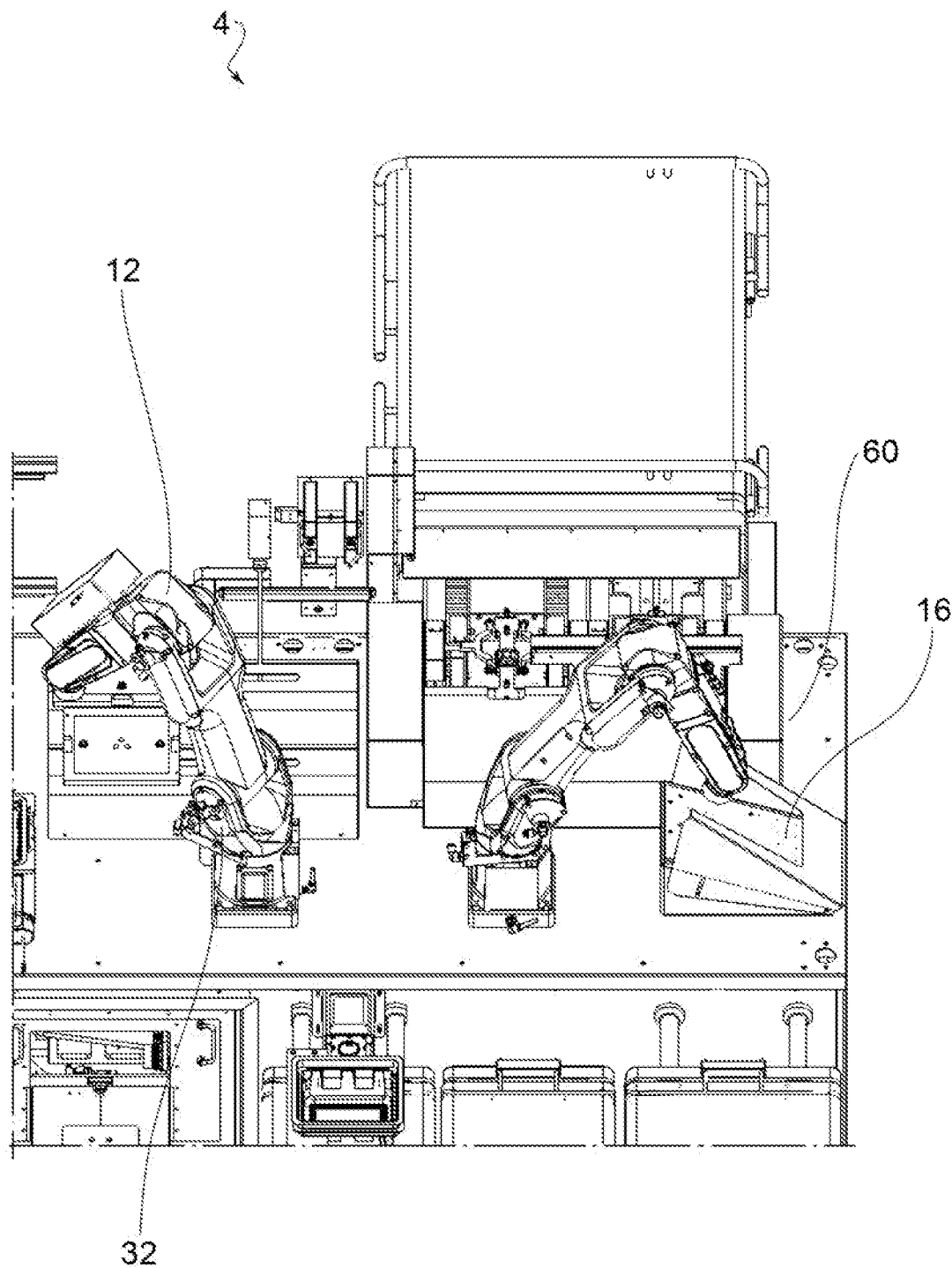
FIGS. 1-2 show partial perspective views of an apparatus in accordance with an embodiment of the present invention.
Figure 2:
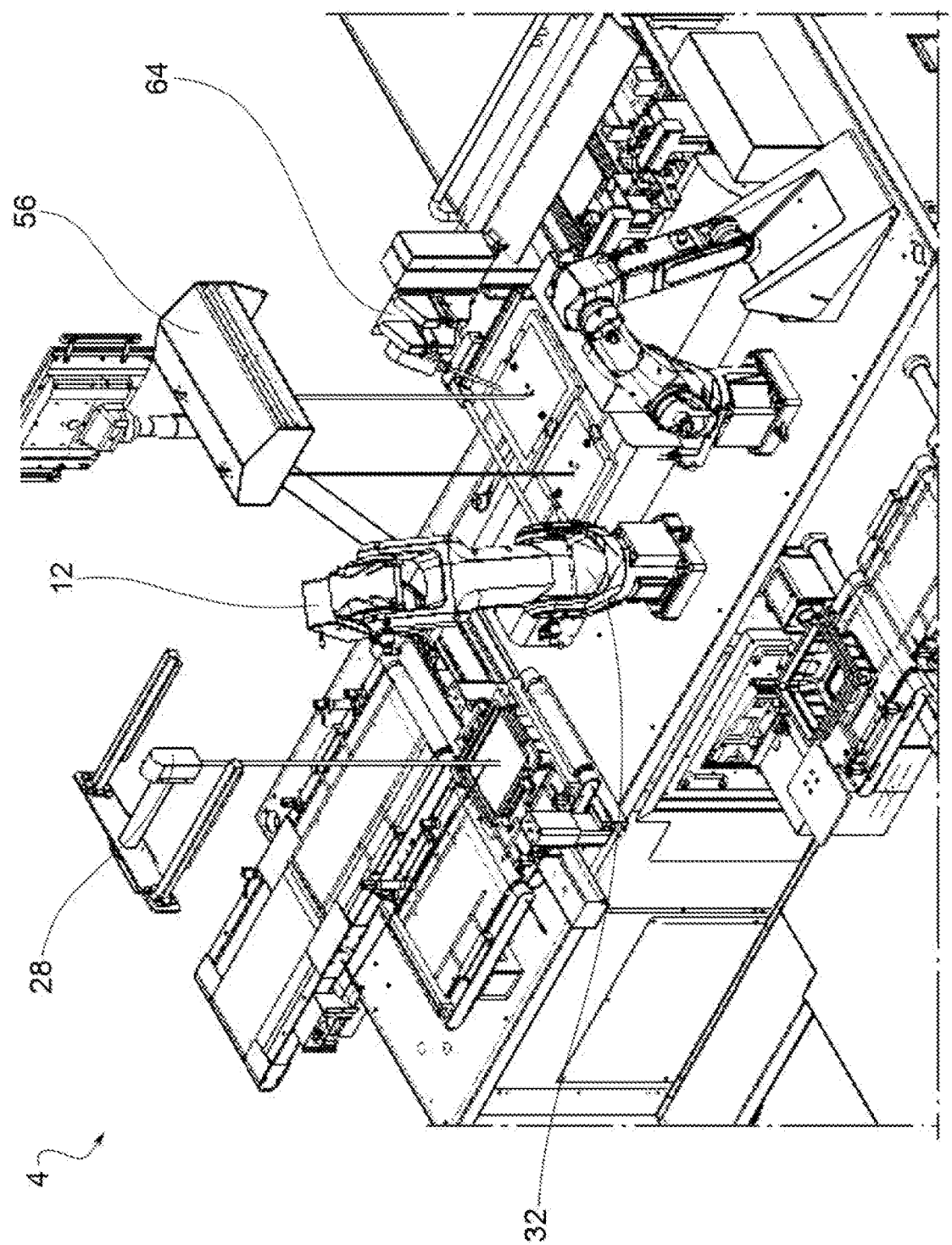
Figure 3:
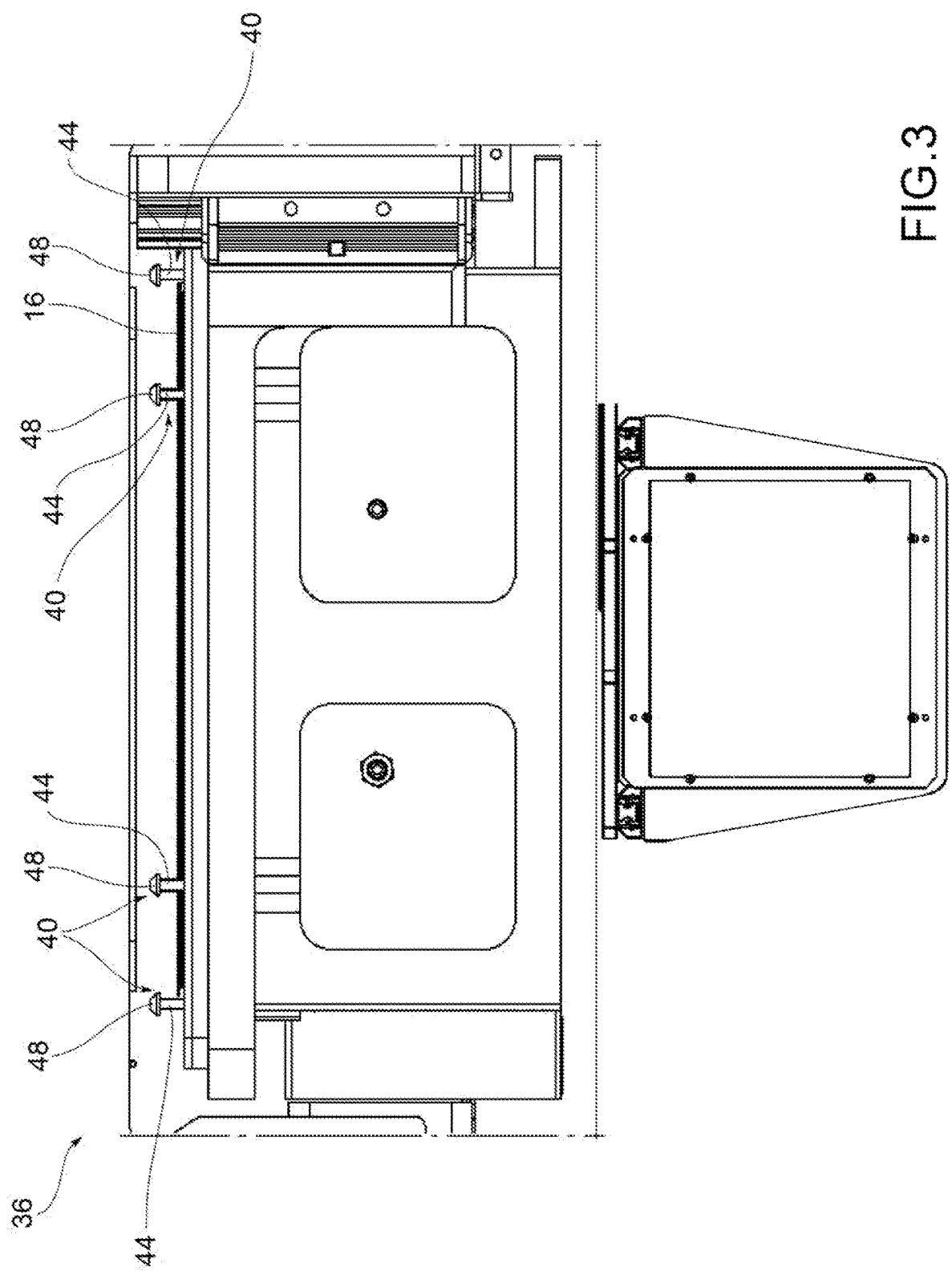
FIG. 3 shows a side view of a welding jig of the apparatus of FIG. 1-2.
Figure 4:
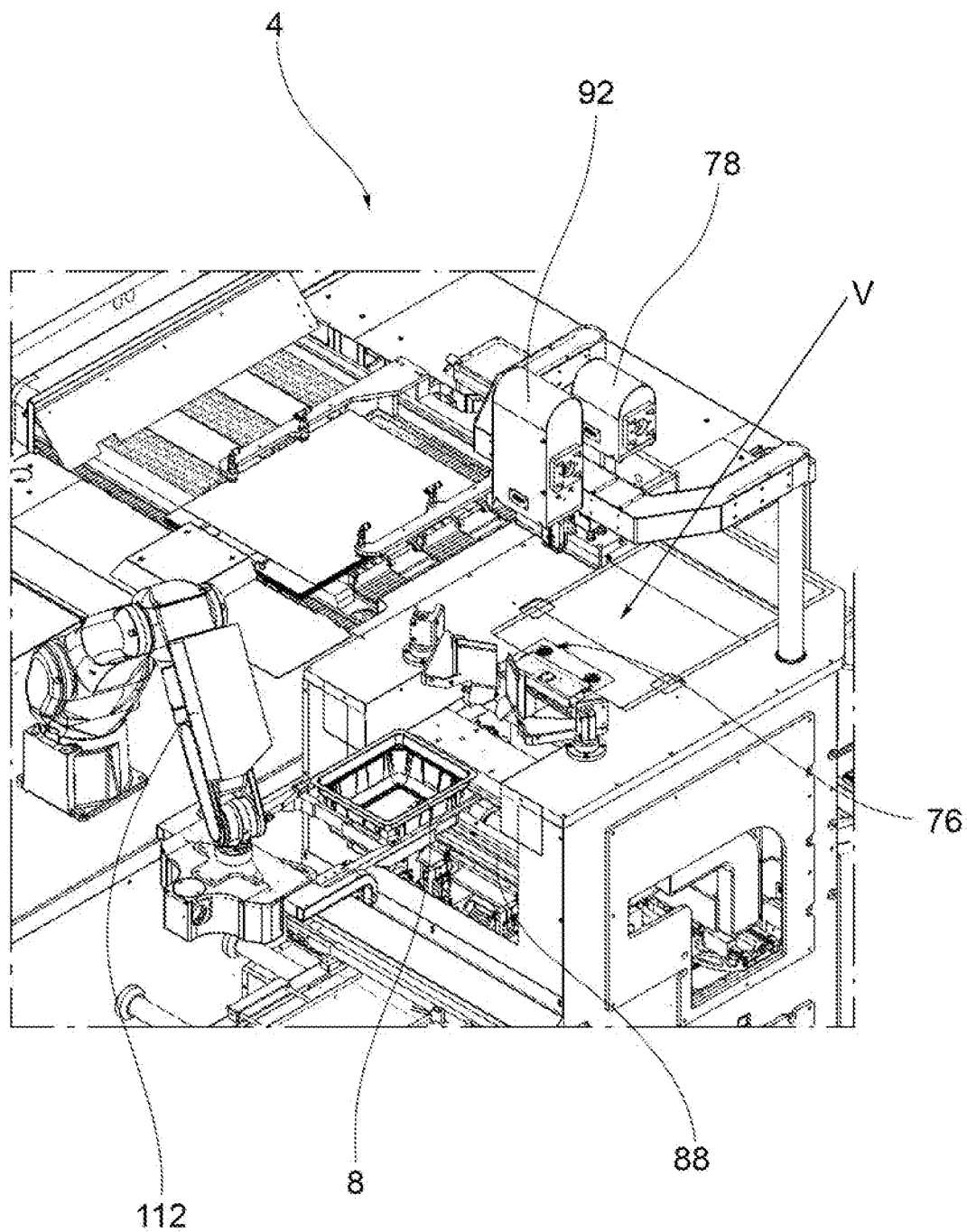
FIG. 4 shows a partial perspective view of an apparatus in accordance with an embodiment of the present invention.
Figure 5:
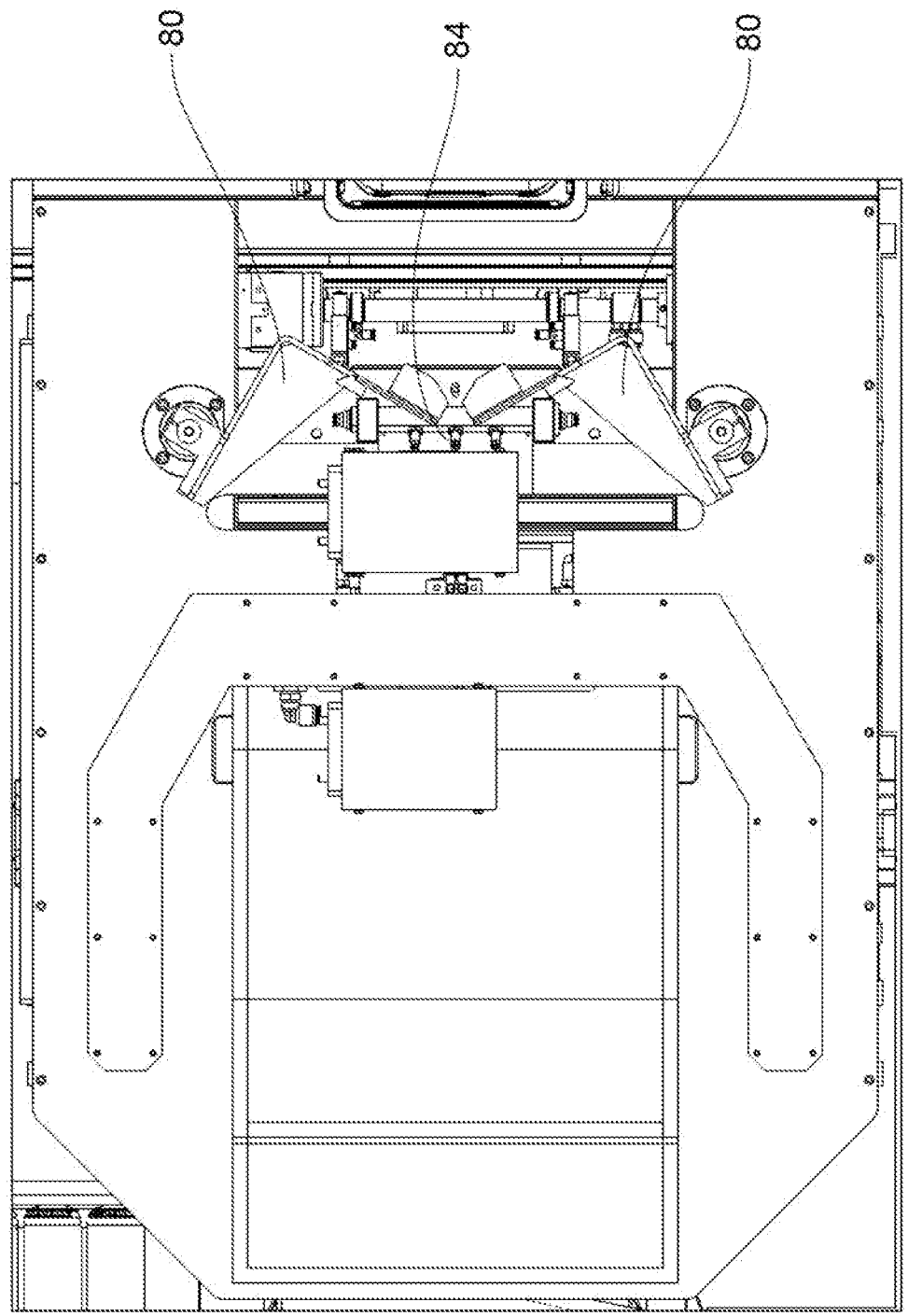
FIG. 5 shows a plan view of the detail V shown in FIG. 4.
Figure 6A:
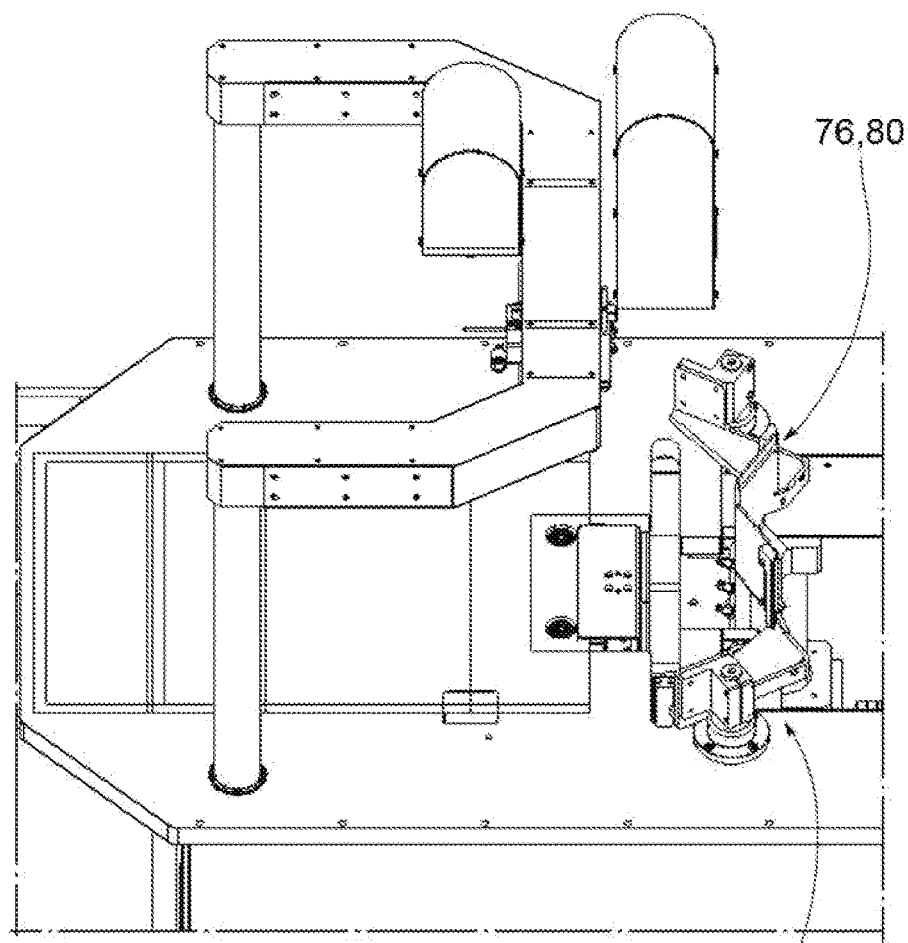
FIGS. 6a-6b show partial perspective views of details of the apparatus of FIG. 4.
Figure 6B:
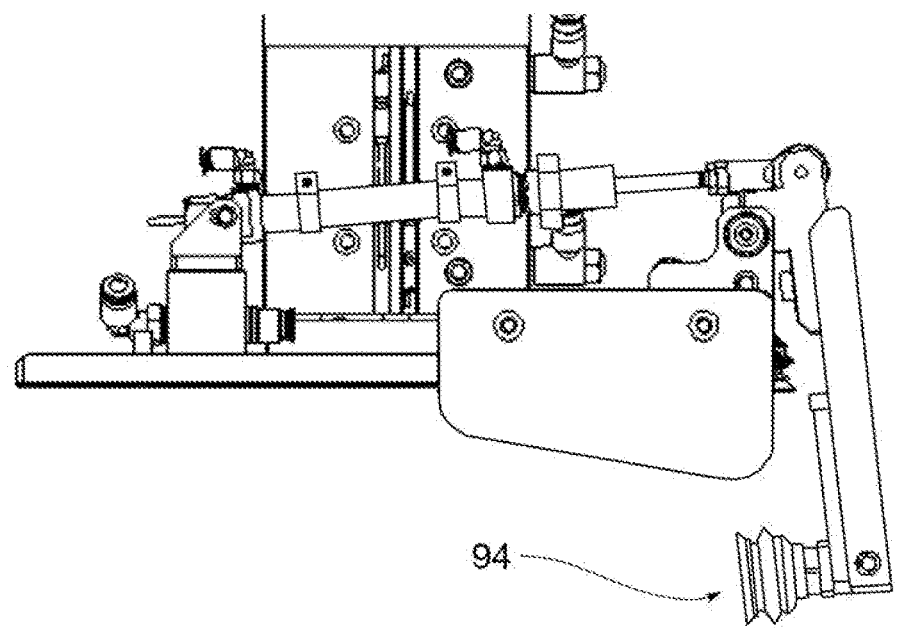
Figure 7:
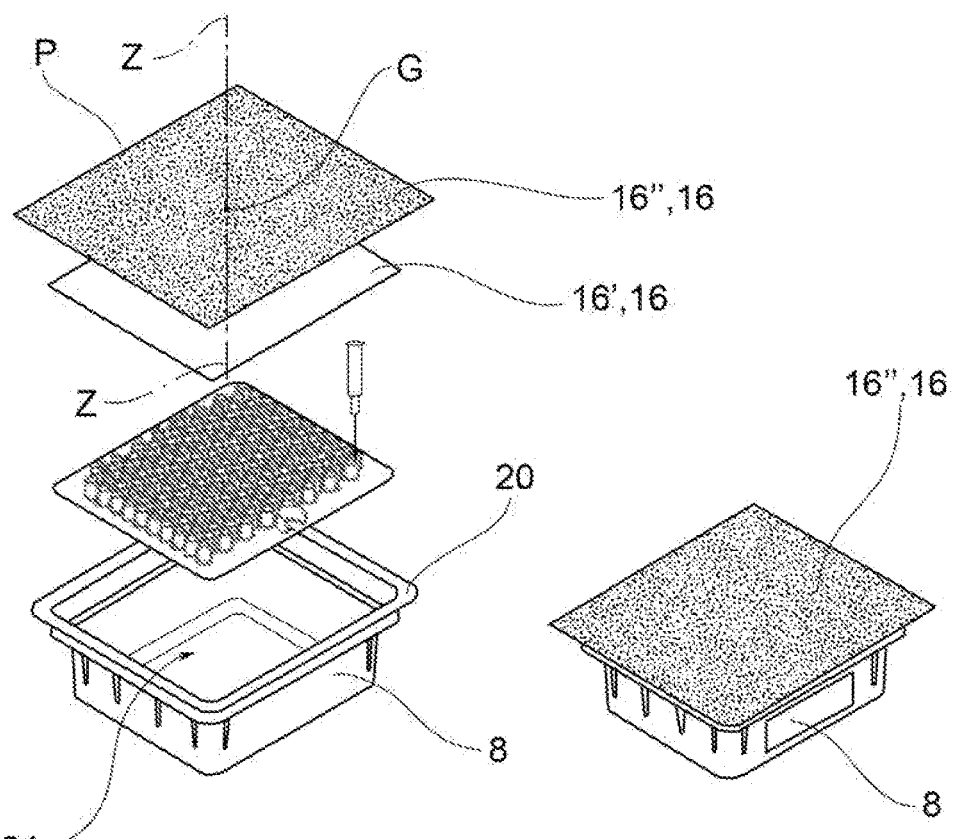
FIG. 7 shows a perspective view of a container in accordance with the present invention, wherein distinct parts are separated from each other.
Figure 8:
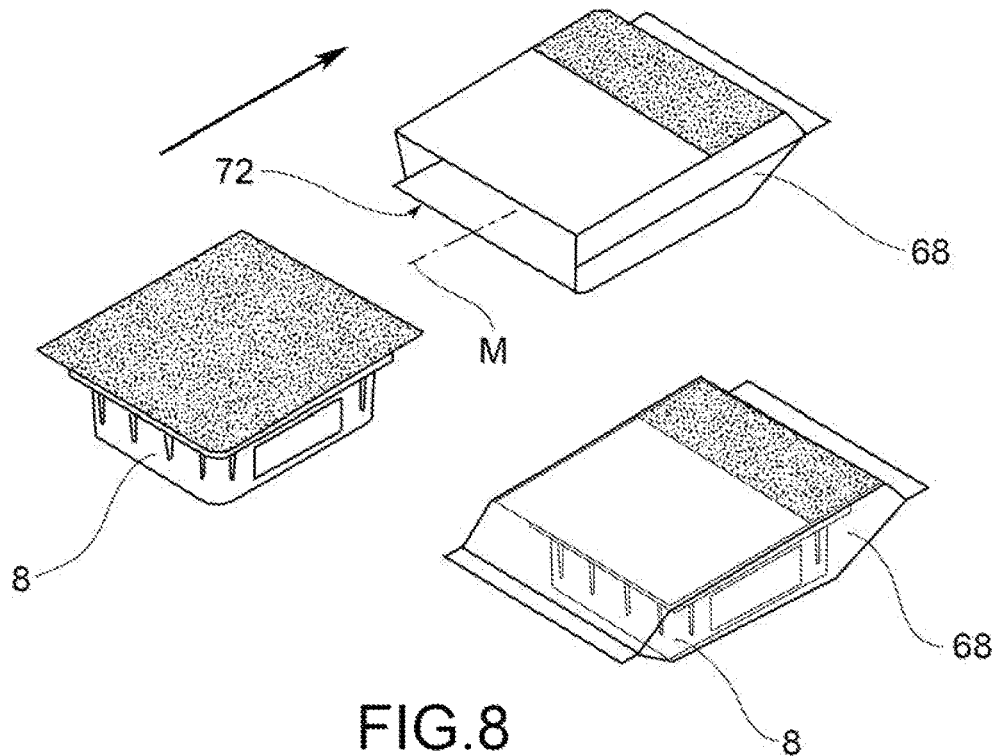
FIG. 8 shows a perspective view of a bag containing a container in accordance with the present invention, wherein distinct parts are separated from each other.

Elements or portions of elements which belong to all the embodiments described below will be indicated by the same numerical references.

DETAILED DESCRIPTION

With reference to the aforementioned figures, numerical reference 4 is used to indicate an apparatus for packaging containers 8 of devices for pharmaceutical use.

The apparatus 4 for the packaging of containers 8 comprises a robotic closing arm 12, movable from a gripping position, in which it picks up a protective sheet 16, from a stack of protective sheets 16, to a release position in which it deposits said protective sheet 16 on a container 8 of devices for pharmaceutical use so as to cover a perimeter edge 20 delimiting an access compartment 24 of said container 8.

The robotic closing arm 12 is advantageously connected to at least one position control camera 56 configured to acquire the coordinates of the centre of gravity G of the protective sheet 16 with respect to a lying plane P on which said protective sheet 16 lies and/or an angle of rotation of the protective sheet 16 with respect to an axis Z perpendicular to said lying plane P, so as to ensure the correct positioning and release of the protective sheet 16 at said perimeter edge 20.

In accordance with an embodiment, the apparatus 4 comprises a position control camera 28 operationally connected with motor means 32 of the robotic closing arm 12, so as to make a feedback control of the actual position of the protective sheet 16 with respect to the perimeter edge 20.

In accordance with an embodiment, the apparatus 4 for the packaging of containers 8 comprises a welding jig 36 configured to support and weld the protective sheet 16, said welding jig 36 comprising a plurality of centring pins 40 configured to center the protective sheet 16 and to prevent any displacement of the protective sheet 16 parallel to the lying plane P of the protective sheet 16 itself.

Preferably, said centring pins 40 are configured in such a way as to prevent vertical movement of the protective sheet 16 along a vertical direction Z perpendicular to the lying plane P of the protective sheet 16.

For example, the centring pins 40 have a mushroom-shaped configuration with a vertical body 44 and a head 48 that protrudes from the body so as to create an undercut with respect to said vertical direction Z perpendicular to the lying plane P of the protective sheet 16.

In accordance with an embodiment, the robotic closing arm 12 is provided with at least one suction cup configured to engage each protective sheet 16 from the corresponding stack of protective sheets 16. In particular, the robotic closing arm 12 is configured to lift each protective sheet 16, by said at least one suction cup, along a lifting direction perpendicular to a lying plane P of each protective sheet 16.

In accordance with an embodiment, the apparatus 4 comprises at least one lamination hood (not shown), configured to create an air flow from above towards said stack of protective sheets 16.

The air flow, preferably laminar, provides a barrier to the entry of impurities into the containers 8.

The apparatus 4 comprises at least one internal storage station 60 configured to store the protective sheets 16 and at least one internal dimension control station 64 configured to control the dimensions of said protective sheets 16.

According to a possible embodiment, the apparatus 4 comprises control sensors for a protective sheet 16,16' which closes the perimeter edge of the container and for a further protective sheet 16,16" overlapped to said protective sheet 16,16' and closing the perimeter edge 20 of the container 8.

For example, the sensors include a control sensor for a closing protective sheet 16" (Lid), typically always having a single type of thickness. This control sensor is typically an ultrasonic sensor. There is also a control sensor for the protective sheet 16', which can have a single or double thickness. In particular, two different types of control sensors for the protective sheet can be provided, depending on the type of protective sheet used. For thinner sheets an ultrasonic sensor is used, while for thicker sheets a fibre-optic sensor is used. In both cases, the check is aimed at detecting that a single sheet has been taken.

The apparatus 4 for the packaging of containers 8 of devices for pharmaceutical use comprises a robotic bagging arm 112 movable from a gripping position, in which it picks up a container 8 previously sealed by at least one protective sheet 16, to a release position in which it inserts said container 8 into a bag 68, after having opened the bag 68 itself on the side of a suitable opening 72. Usually, said bag 68 has a rectangular or square shape and said opening 72 extends, for its entire length, one of the sides of the bag 68.

Advantageously, said robotic bagging arm 112 is connected to at least one position control camera 78 configured to acquire the coordinates of a midpoint M of said opening 72 with respect to a lying plane P on which said bag 68 lies (prior to its opening) and/or an angle of rotation of the bag 68 with respect to an axis perpendicular to said lying plane, so as to ensure the correct positioning and release of the container 8 inside the bag 68.

Preferably, the packaging apparatus 4 comprises a spreader device 76 configured to widen said opening 72 of the bag 68 through which the container 8 is to be inserted.

The position control camera 78 monitors and controls the vertical dimension of the spreader device 76, along a vertical axis Z perpendicular to a resting plane of the bag 68, after it has widened said opening 72.

For example, the spreader device 76 comprises a pair of movable paddles 80 configured to perform at least a partial opening of the bag 68, and nozzles 84 configured to send compressed air to facilitate said opening of the bag 68.

Preferably, the nozzles 84 are associated with said moving paddles 80.

In accordance with an embodiment, the apparatus 4 comprises a welding device 88 configured to weld said opening 72 of the bag 68, upon insertion of the container 8 therein.

In accordance with an embodiment, the apparatus 4 comprises an integrity control camera 92 configured to control the integrity of said weld.

Preferably, said integrity control camera 92 is configured to perform a plurality of weld integrity checks, each at a respective bag of a plurality of bags in which the container is inserted.

For example, said integrity control camera 92 is a linear camera.

For example, a linear camera is associated with a linear lighting flash.

In accordance with a possible embodiment, the apparatus 4 is provided with a suction device 94 having external suction cups configured to suck air through a window made of Tyvek provided on the bag 68.

In accordance with a possible embodiment, the camera 78 is also configured to control the dimensions of the bag 68 prior to its opening, so as to guide the spreader device 76 according to the actual dimensions of the bag 68 to be opened.

The operation of the apparatus for the packaging of containers of devices for pharmaceutical use in accordance with the present invention will now be described.

In particular, the robotic closing arm 12 moves to the gripping position, in which it picks up a protective sheet 16, from a stack of protective sheets 16, and then moves to the release position in which it deposits said protective sheet 16 on a container 8 of devices for pharmaceutical use so as to cover the perimeter edge 20 which delimits the access compartment 24 of said container 8.

The robotic closing arm 12 is advantageously connected to at least one position control camera 56 configured to acquire the coordinates of the centre of gravity G of the protective sheet 16 with respect to the lying plane P on which said protective sheet 16 lies and/or an angle of rotation of the protective sheet 16 with respect to a Z axis perpendicular to said lying plane P, so as to ensure the correct positioning and release of the protective sheet 16 at said perimeter edge 20. This ensures the protective sheet 16 to perfectly cover the access compartment 24 taking care to seal the entire perimeter edge 20 of the container 8. For this purpose, it is in fact essential not only to correctly position the centre of gravity G of protective sheet 16 with respect to the access compartment 24, but also to prevent the sheet itself, despite having its centre of gravity coinciding with the centre of the access compartment 24, from being rotated with respect to the vertical axis perpendicular to the protective sheet 16 and not correctly closing the access compartment 24.

Thanks to the feedback control carried out by the position control camera 28, the robotic closing arm 12 is able to correctly position the protective sheet 16 to close the access compartment 24 of the container 8.

During the gripping of the protective sheet 16, the laminating hood creates an air flow from above towards said stack of protective sheet 16, so as to obtain a barrier to the entry of impurities into the containers 8.

After the protective sheet 16 has been correctly positioned, it is welded to the perimeter edge using the welding jig 36.

In particular, as seen, said welding jig 36 comprises a plurality of centring pins 40 configured to center the protective sheet 16 and to prevent any displacement of the protective sheet 16 parallel to the lying plane P of the protective sheet 16 itself.

The centring pins 40 prevent the vertical movement of the protective sheet 16, along a vertical direction Z perpendicular to the lying plane P of the protective sheet 16, due to the presence of the head 48 that protrudes from the body in such a way as to create an undercut with respect to said vertical direction Z perpendicular to the lying plane P of the protective sheet 16.

As seen, the apparatus 4 for the packaging of containers 8 of devices for pharmaceutical use comprises a robotic bagging arm 112 movable from a gripping position, in which it picks up a container 8 previously sealed by at least one protective sheet 16, to a release position in which it inserts said container 8 into a bag 68, after having opened the bag 68 itself on the side of a suitable opening 72.

Advantageously, said robotic bagging arm 112 is connected to at least one position control camera 78 which reads the coordinates of a midpoint M of said opening 72 with respect to a lying plane P on which said bag 68 lies and/or an angle of rotation of the bag 68 with respect to an axis perpendicular to said lying plane, so as to ensure the correct positioning and release of the container 8 inside the bag 68.

This allows the container 8 previously closed by the protective sheet 16 to be perfectly aligned with the opening 72 of the bag 68 through which the container 8 is to be inserted into the bag 68 itself.

Preferably, the packaging apparatus 4 comprises a spreader device 76 configured to widen said opening 72 of the bag 68 through which the container 8 is to be inserted.

The position control camera 78 monitors and controls the vertical dimension of the spreader device 76, along a vertical axis Z perpendicular to a resting plane of the bag 68, after it has widened said opening 72.

This widening is achieved, for example, by a pair of movable paddles 80 configured to perform at least a partial opening of the bag 68, and by nozzles 84 configured to send compressed air to facilitate said opening of the bag 68.

Preferably, the nozzles 84 are associated with said moving paddles 80. In this way, a single operation can effectively widen the opening, with the combined mechanical action of the moving paddles 80 and fluid-dynamic action of the nozzles 84.

Finally, as seen, after having inserted the container 8 into the bag 68, said opening 72 of the bag 68 can be welded by the welding device 88.

It is also possible to suck air from inside the already closed bag 68 by the suction device 94 provided with external suction cups that suck air through a special window made of Tyvek provided on the bag 68 itself.

As can be appreciated from the above, the solutions described above overcome the drawbacks of the known technique.

In particular, thanks to the specific system for picking up the protective sheets from above, it is possible both not to disturb the laminar flow that protects the containers, and to prevent sliding between sheets and therefore the possible lifting of polluting particles. In addition, this type of picking from above, with the help of suction cups, reduces the risk of picking two protective sheets together, which occurs in the solutions of the known technique.

In addition, the packaging apparatus allows individual sheets made of Tyvek to be picked up and positioned at varying heights according to the indications of at least one camera, guaranteeing a greater precision and repeatability in the positioning of the sheets with respect to the container to be sealed.

In fact, as seen, the position in which the protective sheets made of Tyvek are placed on the container depends on the actual positioning of the sheets themselves when they are picked up; the container is mechanically centred and therefore fixed. The higher accuracy compared to the solutions of the known technique is due to the fact that the camera detects the relative position of the protective sheet and the container in the plane and guides the gripping robot to adapt the coordinates to the actual positioning of the protective sheet, and then places it precisely on the container, which is fixed, to prevent the edges from being misaligned.

In addition, the container is inserted into the welding jig with the outer protective sheet resting on top and held in place laterally and vertically by "mushroom-shaped" pins on the 4 sides in order to prevent it to move before welding.

In fact, the mushroom-shaped pins prevent the outer protective sheet made of Tyvek from lifting up while being transported or while being welded; thus, the protective sheet made of Tyvek cannot move before welding, as it is vertically constrained, and, during translation, air cannot get under the sheet, lifting it up and potentially causing it to escape laterally from the cylindrical pins.

In addition, the bag opening and pulling step before welding is performed at variable heights for each bag, following the indications and measurement of a dedicated camera that communicates with the handling robot and with the machine automation: in this way, the variable height allows the bags to be opened and pulled at the optimum position, resulting in improved process stability that means better machine efficiency and less waste.

In addition, an automatic integrity check is carried out for each bag weld by a dedicated linear camera in the case of both single bag and double bag: the camera intercepts any wrinkles in the weld and discards the corresponding finished product.

The technical advantage lies in the automatic check by camera on both bags, in the case of double bag, and not only on the outer one by visual inspection; in this way the apparatus, unlike the solutions of the known technique, can detect even if the inner seal does not conform.

In addition, the air inside the bag is evacuated after the bag is welded thanks to external suction cups that work on the air-permeable window (made of Tyvek) of the bag itself. This suction step takes place either on the top or on the side depending on the selected format and the resulting position in the bag of the window made of Tyvek.

This allows the overall shape of the bags to be controlled after bagging the containers, and prevents the risk of over-inflated bags breaking, which occurs in the solutions of the known technique.

The scope of protection of the invention is defined by the following claims.

What is claimed is:

1. An apparatus for the packaging of containers of devices for pharmaceutical use, comprising:
    a robotic bagging arm movable from a gripping position, in which said robotic bagging arm picks up a container previously sealed by at least one protective sheet, to a release position in which said robotic bagging arm inserts said container in a bag through a suitable opening provided on a side of said bag;
    wherein said robotic bagging arm is connected to at least one position control camera;
    wherein said position control camera is configured to read coordinates of a midpoint of said opening with respect to a lying plane on which said bag lies and/or an angle of rotation of said bag with respect to an axis perpendicular to said lying plane, so as to ensure a correct positioning and release of said container inside said bag; and
    a spreader device configured to widen said opening of said bag through which said container is to be inserted, and wherein said position control camera monitors and controls a vertical dimension of said spreader device, along a vertical axis perpendicular to the lying plane of said bag, after the spreader device has widened said opening.

2. The apparatus for packaging containers of devices for pharmaceutical use according to claim 1, wherein said spreader device comprises a pair of movable paddles configured to perform at least a partial opening of said bag, and nozzles configured to send compressed air to facilitate opening of said bag.

3. The apparatus for packaging containers of devices for pharmaceutical use according to claim 2, wherein said nozzles are associated with said movable paddles.

4. The apparatus for packaging containers of devices for pharmaceutical use according to claim 1, wherein said apparatus comprises a welding device configured to weld said opening of said bag after insertion of said container therein, and wherein said apparatus comprises an integrity control camera configured to control an integrity of said weld.

5. The apparatus for packaging containers of devices for pharmaceutical use according to claim 4, wherein said integrity control camera is configured to perform a plurality of weld integrity controls, each on a respective bag of a plurality of bags in which said container is inserted.

6. The apparatus for packaging containers of devices for pharmaceutical use according to claim 4, wherein said integrity control camera is a linear camera.

7. The apparatus for packaging containers of devices for pharmaceutical use according to claim 6, wherein said linear camera is associated with a linear illumination flash.

8. The apparatus for packaging containers of devices for pharmaceutical use according to claim 1, wherein said apparatus is provided with a suction device provided with external suction cups configured to suck air through a suitable air-permeable material window provided on said bag.

9. The apparatus for packaging containers of devices for pharmaceutical use according to claim 1, wherein said apparatus comprises a dimension control camera configured to control an actual dimension of said bag prior to opening, so as to guide said spreader device according to actual dimensions of said bag to be opened.

* * * * *